US010603752B2

(12) United States Patent
Morimura

(10) Patent No.: US 10,603,752 B2
(45) Date of Patent: Mar. 31, 2020

(54) MACHINE TOOL

(71) Applicant: OKUMA Corporation, Niwa-gun, Aichi (JP)

(72) Inventor: Shoichi Morimura, Aichi (JP)

(73) Assignee: OKUMA CORPORATION, Niwa-Gun, Aichi (JP)

( * ) Notice: Subject to any disclaimer, the term of this patent is extended or adjusted under 35 U.S.C. 154(b) by 0 days.

(21) Appl. No.: 15/581,409

(22) Filed: Apr. 28, 2017

(65) Prior Publication Data
US 2017/0326701 A1    Nov. 16, 2017

(30) Foreign Application Priority Data

May 11, 2016 (JP) .................................. 2016-095531

(51) Int. Cl.
| | | |
|---|---|---|
| *B23Q 11/00* | (2006.01) | |
| *B23K 26/00* | (2014.01) | |
| *B23Q 11/10* | (2006.01) | |
| *B23Q 17/24* | (2006.01) | |
| *B25J 9/00* | (2006.01) | |
| *B25J 11/00* | (2006.01) | |

(52) U.S. Cl.
CPC ........ *B23Q 11/005* (2013.01); *B23K 26/0093* (2013.01); *B23Q 11/1084* (2013.01); *B23Q 17/2409* (2013.01); *B25J 9/0096* (2013.01); *B25J 11/0055* (2013.01)

(58) Field of Classification Search
CPC ... B23Q 1/76; B23Q 7/04; B23Q 17/22; B25J 9/0009; B25J 13/088; G05B 19/401; G05B 19/41825; G05B 2219/50122
See application file for complete search history.

(56) References Cited

U.S. PATENT DOCUMENTS

| | | | | | |
|---|---|---|---|---|---|
| 4,359,815 | A | * | 11/1982 | Toyoda | B23Q 3/15713 414/225.01 |
| 4,838,135 | A | * | 6/1989 | Hevoyan | B23Q 7/04 82/124 |
| 5,254,068 | A | * | 10/1993 | Yamada | G05B 19/40937 29/27 R |

(Continued)

FOREIGN PATENT DOCUMENTS

| | | |
|---|---|---|
| CN | 105081784 A | 11/2015 |
| CN | 105397544 A | 3/2016 |

(Continued)

OTHER PUBLICATIONS

Taiwanese Final Office Action corresponding to Application No. 10820497310; dated May 28, 2019.

(Continued)

*Primary Examiner* — Alan Snyder
(74) *Attorney, Agent, or Firm* — Cantor Colburn LLP

(57) ABSTRACT

A machine tool that cuts a workpiece by a rotary tool includes a tool spindle device that holds the rotary tool in a manner to allow self-rotation with a predefined tool rotational axis Rt as a center, one or more in-machine robots, and a connecting mechanism that attaches the in-machine robot on the tool spindle device so that the in-machine robot moves independently from the rotary tool at a periphery of the tool spindle device with the tool rotational axis Rt as a center.

8 Claims, 9 Drawing Sheets

(56) References Cited

U.S. PATENT DOCUMENTS

| | | | |
|---|---|---|---|
| 6,374,158 B1* | 4/2002 | Fusaro, Jr. | B23K 10/027 |
| | | | 700/254 |
| 8,215,214 B2* | 7/2012 | Sakai | B23B 3/168 |
| | | | 82/164 |
| 2010/0028117 A1* | 2/2010 | Nihei | B25J 9/0009 |
| | | | 414/728 |
| 2010/0061830 A1* | 3/2010 | Kitayama | B23Q 7/04 |
| | | | 414/222.05 |
| 2010/0288088 A1* | 11/2010 | Miyamoto | B23Q 1/76 |
| | | | 82/1.11 |
| 2013/0121779 A1* | 5/2013 | Geiser | B23F 19/10 |
| | | | 409/8 |
| 2016/0067840 A1 | 3/2016 | Fujimoto et al. | |
| 2017/0050282 A1* | 2/2017 | Kruck | B23Q 3/061 |
| 2017/0329316 A1* | 11/2017 | Morimura | B25J 15/0019 |
| 2017/0341196 A1* | 11/2017 | Nakamura | B25J 19/0025 |
| 2018/0059637 A1* | 3/2018 | Shimodaira | G05B 19/401 |
| 2018/0093380 A1* | 4/2018 | Yoshida | B25J 5/007 |
| 2018/0126567 A1* | 5/2018 | Morimura | B08B 3/02 |
| 2018/0141174 A1* | 5/2018 | Mori | B23P 23/04 |

FOREIGN PATENT DOCUMENTS

| | | |
|---|---|---|
| CN | 105458409 A | 4/2016 |
| JP | 05301141 A | 11/1993 |
| JP | 05301142 A | 11/1993 |
| JP | 2001322049 A | 11/2001 |
| JP | 2010036285 A | 2/2010 |
| JP | 2010064158 A | 3/2010 |
| TW | M333264 | 6/2008 |
| TW | M377280 U1 | 4/2010 |
| WO | 2015012992 A2 | 1/2015 |

OTHER PUBLICATIONS

Taiwanese Office Action corresponding to Application No. 106114186; dated Dec. 3, 2018.
Chinese First Office Action corresponding to Application No. 2017103303692; dated Nov. 12, 2019.
JP Notice of Grounds for Rejection corresponding to Application No. 2016-095531; dated Dec. 3, 2019.

* cited by examiner

MACHINE TOOL

CROSS REFERENCE TO RELATED APPLICATION

The entire disclosure of Japanese Patent Application No. 2016-095531 filed on May 11, 2016, including the specification, claims, drawings, and abstract, is incorporated herein by reference in its entirety.

TECHNICAL FIELD

The present disclosure relates to a machine tool which cuts and machines a workpiece or forms a workpiece by irradiation with energy or a material.

BACKGROUND

Recently, demands for automation and higher performances of machine tools are increasing. In order to realize automation, automatic changer apparatuses are proposed such as an automatic tool changer (ATC) which automatically changes tools, and an automatic palette changer (APC) which automatically changes a palette on which a workpiece is mounted. In addition, peripheral apparatuses such as a workpiece supply apparatus such as a loader and a bar feeder are also widely known. In order to realize higher performance, in-machine measurement and intelligent system using sensors are also employed.

Further, in order to automate or improve performance of machine tools, in some cases, use of a robot is proposed. For example, JP 2010-36285 A discloses a technique in which a robot provided outside of the machine tool is used, to execute attachment and detachment of the workpiece to and from the machine tool. JP 2010-64158 A discloses a technique in which an articulated robot which travels on a gantry rail attached on an upper part of the machine tool is provided, and the transport of the workpiece or the like among a plurality of machine tools is executed by the articulated robot. JP H5-301141 A and JP H5-301142 A disclose a transporting tool of a workpiece which transports the workpiece by an open/close operation of a grip unit. The transporting tool has an arm shape, and is attached to a body function box. The body function box is also provided at a right side of a spindle head which supports a spindle. The transporting tool can pivot about an axis approximately orthogonal to a long axis of the spindle. The transporting tool can change, by the pivoting movement, between a state in which the arm is approximately horizontal and a state in which the arm is approximately vertical.

In the related art, however, no robot is described which can access the workpiece and tool with various positions and orientations. Specifically, normally, a body part of the machine tool is covered with a cover in view of safety and surrounding environment. Therefore, when it is desired to access an inside of a machining chamber using a robot provided at a location other than the body part of the machine tool as in JP 2010-36285 A and JP 2010-64158 A, a door of the machining chamber must be opened. Thus, with the robots of JP 2010-36285 A and JP 2010-64158 A, while it is possible to attach or detach the workpiece when the workpiece is not being machined, it is not possible for the robot to access the workpiece or the tool during the machining; that is, when the door of the machining chamber is closed. As a result, with the techniques of JP 2010-36285 A and JP 2010-64158 A, the usages of the robots are limited.

As described in JP H5-301141 A and JP H5-301142 A, there exist techniques in which a robot such as a transporting tool is fixed on a spindle head. According to such techniques, the robot can access the workpiece and the tool even in the state where the door of the machining chamber is closed. However, in this case, the position of the robot with respect to the spindle head is fixed, and thus, in order to allow access to the opposite side of the robot with the spindle head therebetween, the size of the robot must be increased. For example, when the robot is an articulated robot in which a plurality of arms are connected by joints, the lengths of the arms must be elongated. When any of the arms is elongated, however, interference with other members tends to occur more easily, and a torque necessary for moving the joints in also increased.

An advantage of the present disclosure lies in provision of a machine tool having a robot of a smaller size, which can access a workpiece and a tool in various positions and orientations.

SUMMARY

According to one aspect of the present disclosure, there is provided a machine tool that cuts a workpiece by a tool, the machine tool comprising: a tool spindle device that holds the tool in a manner to allow self-rotation with a predefined tool rotational axis as a center; one or more robots; and a connecting mechanism that attaches the one or more robots on the tool spindle device so that the one or more robots move independently from the tool at a periphery of the tool spindle device with the tool rotational axis as a center.

The robot may be able to access at least one of the tool and the workpiece during execution of machining of the workpiece by the tool.

The robot may execute at least one of a support of machining of the workpiece by the tool, sensing related to the tool or the workpiece during the machining, and additional machining.

The robot may be an arm-type robot comprising: one or more end effectors that act on a target; one or more arms that support the one or more end effectors; and one or more joints provided at ends of the one or more arms.

The tool spindle device may be able to swing with an axis orthogonal to the tool rotational axis as a center.

The robot may comprise a grip unit that can grip the tool or the workpiece.

The machine tool may be a multi-tasking machine having a lathe function to lathe-turn the workpiece, and may comprise: a workpiece spindle device that holds the workpiece in a manner to allow self-rotation; and a tool post that holds a lathe-turning tool which lathe-turns the self-rotating workpiece. In this case, the robot may be able to access at least one of the workpiece and the lathe-turning tool during lathe-turning machining by the lathe-turning tool.

According to another aspect of the present disclosure, there is provided a machine tool that radiates energy or a material in a predefined irradiation axis direction to form a workpiece, the machine tool comprising: an irradiation head that radiates the energy or the material in the irradiation axis direction; one or more robots; and a connecting mechanism that attaches the one or more robots on the irradiation head so that the one or more robots move at a periphery of the irradiation head with the irradiation axis as a center.

Advantageous Effects of Invention

According to a machine tool of various aspects of the present invention, a robot is attached in a rotatable manner on a tool spindle device or an irradiation head. Therefore, even when the size of the robot is reduced, a position and an orientation of the robot can be changed significantly. As a result, the robot can access the workpiece, the tool, or the like in various positions and orientations.

BRIEF DESCRIPTION OF DRAWINGS

Embodiment(s) of the present disclosure will be described by reference to the following figures, wherein.

DESCRIPTION OF EMBODIMENTS

Figure 1:
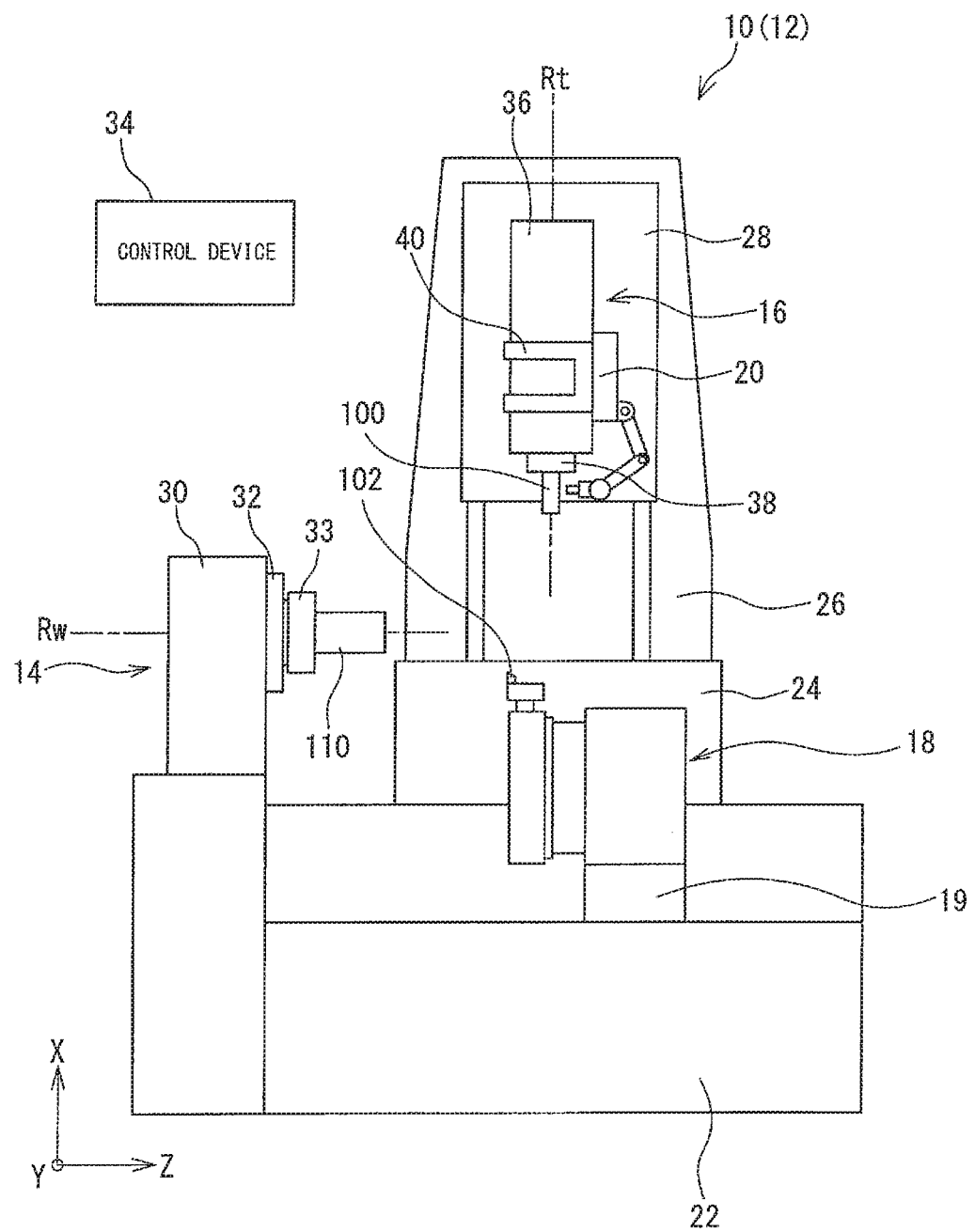
FIG. 1 is a diagram showing a structure of a machine tool.

A structure of a machine tool 10 will now be described with reference to the drawings. FIG. 1 is a diagram schematically showing a structure of the machine tool 10. In the following description, a rotational axis direction of a workpiece spindle 32 will be referred to as a Z-axis, a vertical direction orthogonal to the Z-axis will be referred to as an X-axis, and a direction orthogonal to the Z-axis and the X-axis will be referred to as a Y-axis. On the Z-axis, a direction from the workpiece spindle 32 toward a tool post 18 will be referred to as a positive direction. On the X-axis, a direction from the workpiece spindle 32 toward a tool spindle 38 will be referred to as a positive direction, and on the Y-axis, a direction from the tool spindle 38 toward a middle base 28 will be referred to as a positive direction.

The machine tool 10 is a multi-tasking machine having a lathe-turning function to cut a workpiece 110 by contacting a lathe-turning tool 102 while rotating the workpiece 110, and a rotation-cutting function to cut the workpiece 110 with a rotary tool 100. A periphery of a body 12 of the machine tool 10 is covered by a cover (not shown). A space defined by the cover is a machining chamber where machining of the workpiece 110 takes place. On the cover, at least one opening and a door which opens and closes the opening (both of which are not shown in the figure) are formed. An operator accesses the body 12 of the machine tool 10, the workpiece 110, or the like through the opening. During the machining, the door provided on the opening is closed. This is for sake of safety and the surrounding environment.

The body 12 comprises a workpiece spindle device 14 which holds the workpiece 110 in a manner allow self-rotation, a tool spindle device 16 which holds the rotary tool 100 in a manner to allow self-rotation, and the tool post 18 which holds the lathe-turning tool 102. The workpiece spindle device 14 comprises a spindle base 30 mounted on a base 22, and the workpiece spindle 32 attached to the spindle base 30. The workpiece spindle 32 includes a chuck 33 and a collet which hold the workpiece 110 in a detachable manner, and the workpiece 110 to be held can be arbitrarily exchanged. The workpiece spindle 32 also self-rotates with a workpiece rotational axis Rw which extends in the horizontal direction (Z-axis direction in FIG. 1) as a center.

The tool spindle device 16 holds a tool for rotation-cutting (the rotary tool 100), for example, a tool called a fraise and an end mill, in a manner to allow self-rotation, and comprises a spindle head 36 having a drive motor or the like inside, and the tool spindle 38 attached on the spindle head 36. The tool spindle 38 comprises a clamper which holds the rotary tool 100 in a detachable manner, and the rotary tool 100 to be held may be exchanged as necessary. The tool spindle 38 also self-rotates with a tool rotational axis Rt which extends in the vertical direction (X-axis direction in FIG. 1) as a center.

On the spindle head 36, an in-machine robot 20 is attached via a connecting mechanism 40. The in-machine robot 20 is used for supporting the machining process, various sensing processes, auxiliary works, or the like. A structure and a function of the in-machine robot 20 will be described later in detail.

Further, the spindle head 36 can swing around a swing axis St (refer to FIG. 2) which passes through the spindle head 36 and extends in the Y-axis direction. With the spindle head 36 swinging around the swing axis St, the orientations of the rotary tool 100 and the in-machine robot 20 are changed.

The spindle head 36 is attached on the middle base 28. The middle base 28 is attached on a column 26 via an X-axis guiderail (not shown), and can be moved upward and downward (can be moved in the X-axis direction) with respect to the column 26. The column 26 is attached on a saddle 24 via a Y-axis guiderail, and can be moved in the Y-axis direction with respect to the saddle 24. Further, the saddle 24 is attached on the base 22 via a Z-axis guiderail, and can be moved in the Z-axis direction with respect to the base 22. The saddle 24, the column 26, and the middle base 28 are suitably moved so that the tool spindle device 16, and consequently, the rotary tool 100 and the in-machine robot 20 attached to the tool spindle device 16, can be moved linearly to a desired position.

The tool post 18 holds the lathe-turning tool 102 such as, for example, a tool called a "bite." The tool post 18 is attached to a lower saddle 19 via an X-axis guiderail, and can be moved upward and downward (can be moved in the X-axis direction) with respect to the lower saddle 19. The lower saddle 19 is attached to the base 22 via a Z-axis guiderail, and can be moved in the Z-axis direction. As a result, the lathe-turning tool 102 can be moved in the X-axis direction and in the Z-axis direction.

A control device 34 controls driving of various parts of the machine tool 10 in response to a command from an operator. The control device 34 is formed from, for example, a CPU which executes various calculations, and a memory which stores various control programs and control parameters. The control device 34 further has a communication function, and can exchange various data such as, for example, NC program data, with other devices. The control device 34 may include, for example, a numerical control device that calculates, when necessary, positions of the tools 100 and 102 and the workpiece 110. The control device 34 may be a single device or a combination of a plurality of calculator devices.

Figure 2:
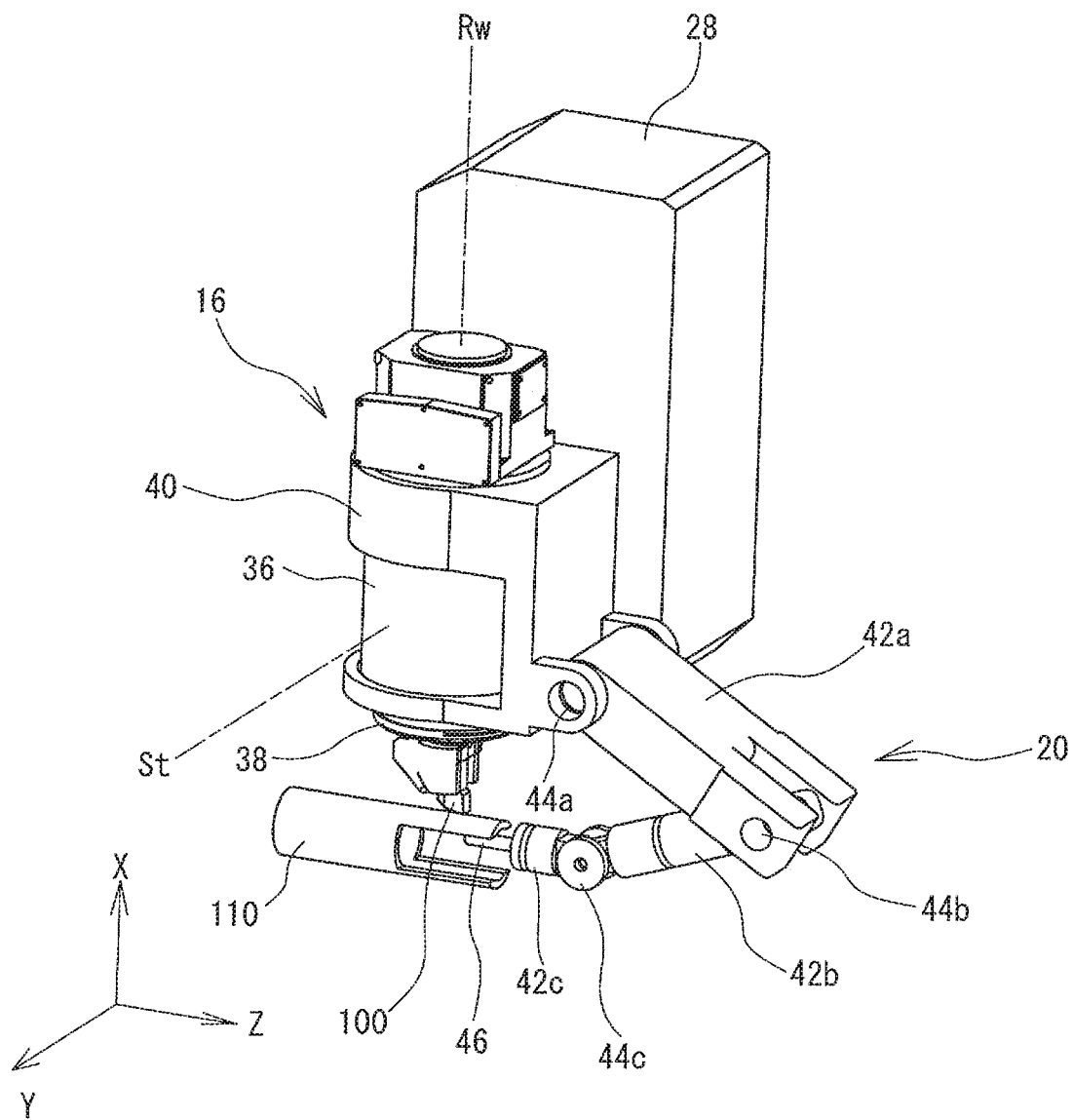
FIG. 2 is a perspective diagram of a periphery of an in-machine robot.

Next, the in-machine robot 20 attached to the tool spindle device 16 will be described with reference to FIGS. 2-5. FIGS. 2-5 are perspective diagrams of a periphery of the in-machine robot 20. As shown in FIG. 2, the in-machine robot 20 is an articulated robot having a plurality of arms 42a-42c and a plurality of joints 44a-44c. As already described, the in-machine robot 20 is attached to the spindle head 36 via the connection mechanism 40. The spindle head 36 has an approximate circular tube shape, and has a center axis coinciding with the tool rotational axis Rt. As already described, the spindle head 36 can linearly move with the movement of the saddle 24, the column 26, and the middle base 28. Further, the spindle head 36 is attached in a rotatable manner on the middle base 28, and can swing around the swing axis St extending in the Y-axis direction (horizontal direction) as a center.

The connecting mechanism 40 is attached on the spindle head 36 via a bearing (not shown), and is rotatable with respect to the spindle head 36. A rotational axis of the connecting mechanism 40 coincides with the tool rotational axis Rt. An actuator such as a motor is attached on the connecting mechanism 40, and driving of the actuator is controlled by the control device 34.

The in-machine robot 20 comprises first through third arms 42a-42c (hereinafter, when "first" through "third" are not to be distinguished, the letter in the reference numeral will be omitted, and the arms will be simply referred to as "arms"; the same convention is applicable to other constituting elements), first through third joints 44a-44c provided respectively at ends of the arms, and an end effector 46. A base end of the first arm 42a is connected to the connecting mechanism 44 via the first joint 44a, a base end of the second arm 42b is connected to a tip end of the first arm 42a via the second joint 44b, and a base end of the third arm 42c is connected to a tip end of the second arm 42b via the third joint 44c. Each of the first through third joints 44a-44c has a swing axis in the Y-axis direction (direction orthogonal to the tool rotational axis Rt), and each arm 42 swings around the swing axis as a center. An actuator such as a motor is attached to each of the first through third joints 44a-44c, and driving of the actuator is controlled by the control device 34. The control device 34 calculates a position of the end effector 46 to be described later, based on an amount of driving of the actuator provided on the connecting mechanism 40 and the joints 44a-44c.

On a tip end of the third arm 42c, the end effector 46 which acts on a target is provided. No particular limitation is imposed on the end effector 46, so long as the end effector 46 realizes some effect. Therefore, the end effector 46 may be, for example, a sensor which senses information related to a target or a peripheral environment of the target. In this case, the end effector 46 may be, for example, a contact sensor which detects presence/absence of contact with the target; a distance sensor which detects a distance to the target; a vibration sensor which detects vibration of the target; a pressure sensor which detects a pressure applied by the target; or a sensor which detects a temperature of the target. A detection result of the sensor is stored and analyzed in correlation to positional information of the end effector 46 calculated based on the amounts of driving of the connecting mechanism 40 and the joints 44a-44c. For example, when the end effector 46 is a contact sensor, the control device 34 analyzes a position, a shape, and a movement of the target based on the timing of detection of the contact with the target, and the positional information acquired at this timing.

Alternatively, as another configuration, the end effector 46 may be a holding mechanism which holds the target. The form of holding may be a hand type in which the target is gripped by a pair of members, a type of suctioning and holding the target, or a type in which the target is held using a magnetic force or the like.

As an alternative configuration, the end effector 46 may be a device which outputs fluid for supporting machining. Specifically, the end effector 46 may be a device which discharges air for blowing swarf, or a cooling fluid (cutting oil, cutting water, or the like) for cooling the tools 100 and 102 or the workpiece 110. Alternatively, the end effector 46 may be a device which discharges energy or a material for forming a workpiece. Therefore, for example, the end effector 46 may be a device which discharges laser or arc, or a device which discharges a material for layering and forming. Further, as an alternative configuration, the end effector 46 may be a camera which captures an image of the target. In this case, an image obtained by the camera may be displayed on an operation panel or the like.

No particular limitation is imposed on the target on which the end effector 46 acts, so long as the target is located within the machining chamber. Therefore, the target may be the rotary tool 100 held on the tool spindle 38, or the workpiece held on the workpiece spindle device 14. Moreover, the target may be the lathe-turning tool 102 held on the tool post 18. In addition, the target may be a target other than the tools 100 and 102 and the workpiece 110, and may be, for example, the swarf spread in the machining chamber, a component assembled to the workpiece 110, or a constituting component of the machine tool 10 (such as the chuck 33 of the workpiece spindle 32, a collet of the tool spindle 38, or the like).

In the above description, the number of the end effector 46 is described as one, but the number of end effector 46 is not limited to one, and may be a plurality. Further, it is sufficient that the end effector 46 is provided at least on the in-machine robot 20, and the provision position is not limited to the tip of the articulated arm, and may alternatively be partway on the articulated arm.

Next, a movement of the in-machine robot 20 as described above will be described. The spindle head 36 moves and swings as suited according to the situation of machining. The in-machine robot 20 attached to the spindle head 36 executes support of machining, sensing, supportive work, or the like as necessary. In this process, the in-machine robot 20 moves the joints 44 as necessary to change a position and an orientation of the end effector 46. In particular, in the exemplified cases, the in-machine robot 20 can be rotated around the tool rotational axis Rt as a center according to the position and orientation of the end effector 46 accessing the target. In other words, the in-machine robot 20 can move at the periphery of the spindle head 36 with the tool rotational axis Rt as a center. In the following description, the description "access" means that the in-machine robot 20 moves close to the target, to a position where the objective of the operation of the in-machine robot 20 can be achieved. Therefore, when the end effector 46 of the in-machine robot 20 is a temperature sensor which contacts the target and detects the temperature thereof, the description "access" means that the end effector 46 moves close to the target, to a position where the end effector 46 contacts the target. When the end effector 46 is a temperature sensor which detects the temperature without contact, the description "access" means that the end effector 46 moves close to the target, to a position where the temperature of the target can be detected.

Figure 3:
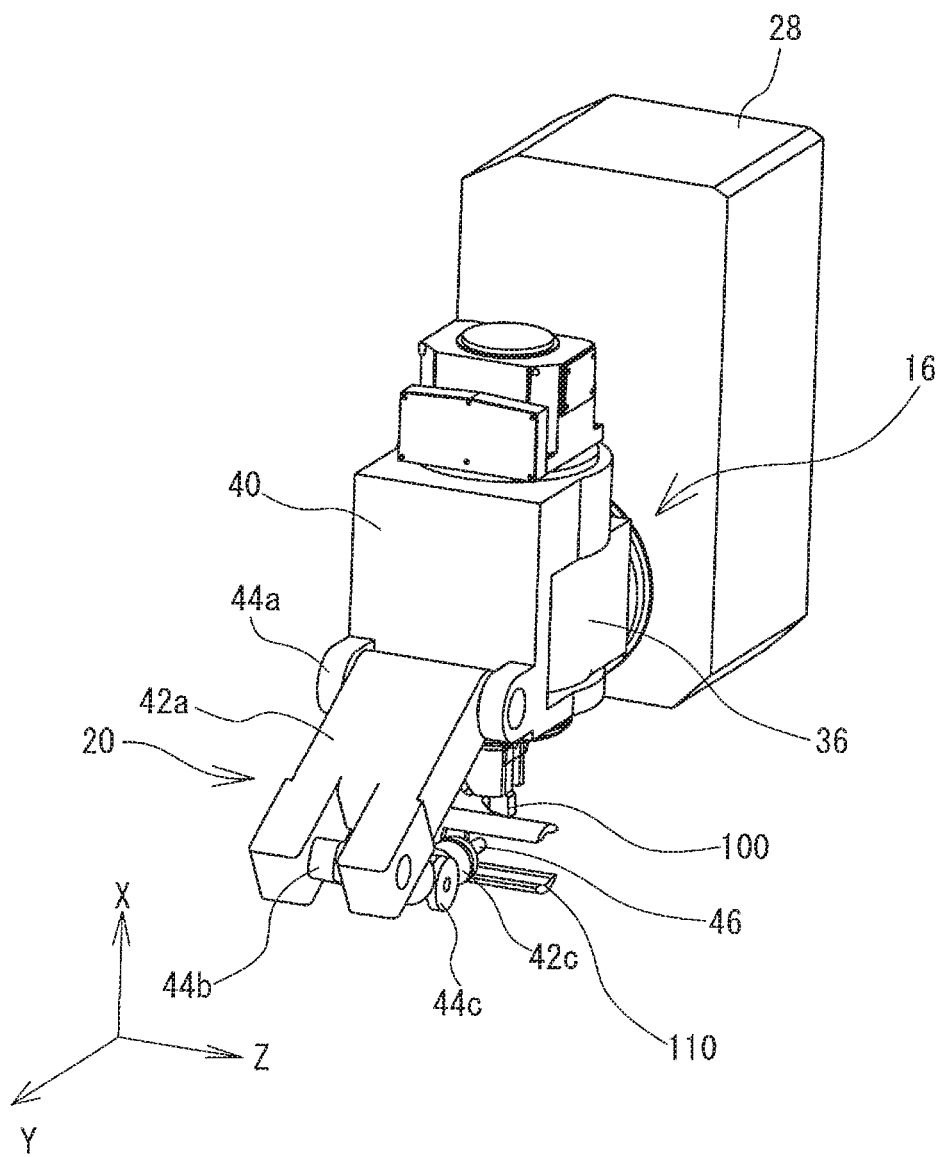
FIG. 3 is a perspective diagram of a periphery of an in-machine robot.
Figure 4:
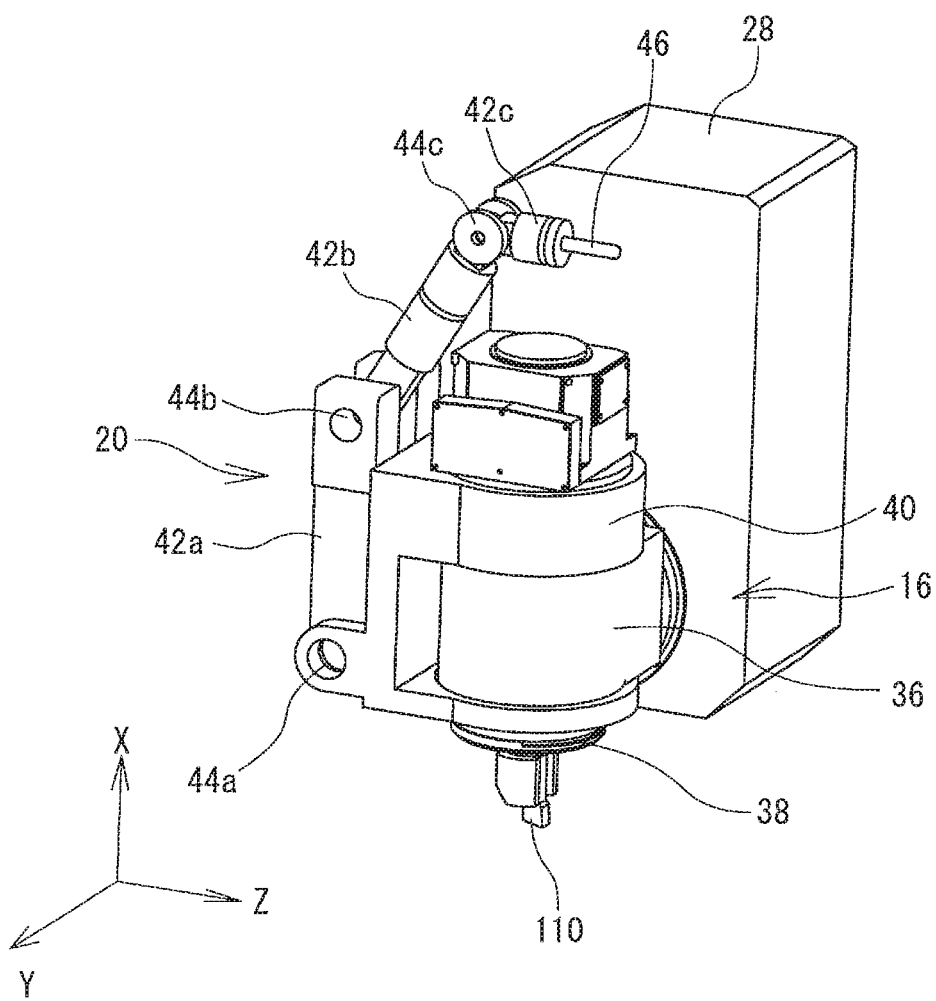
FIG. 4 is a perspective diagram of a periphery of an in-machine robot.
Figure 5:
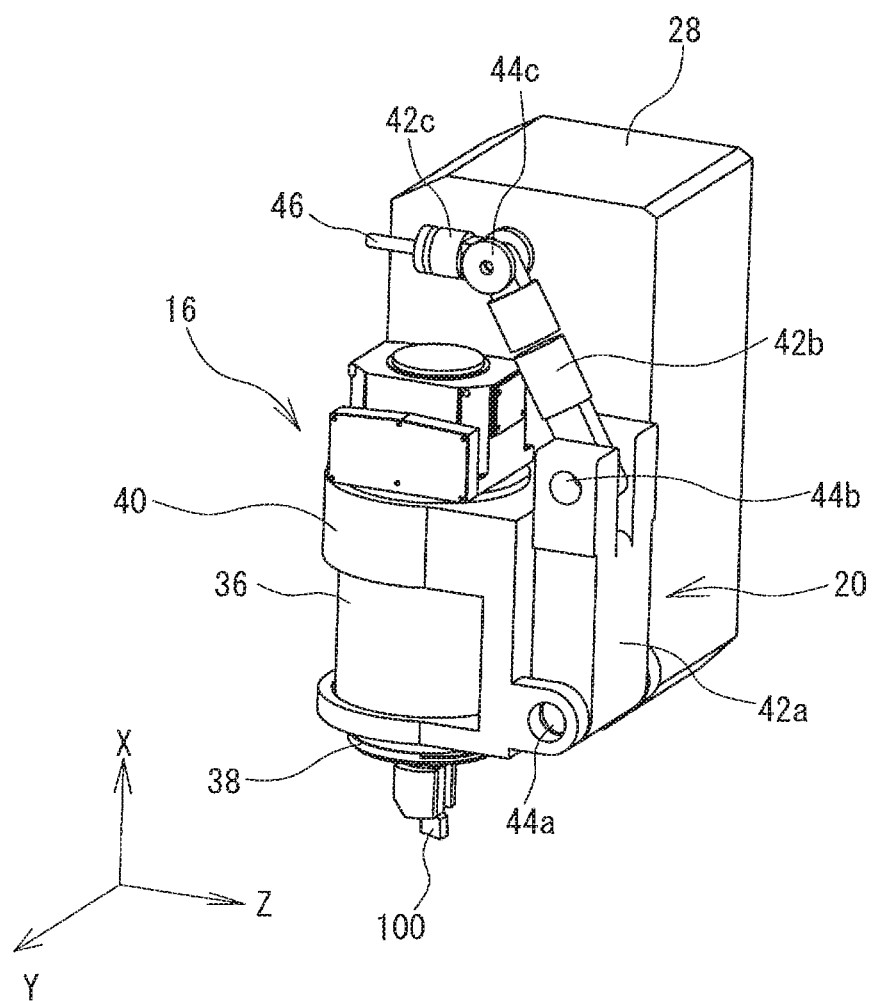
FIG. 5 is a perspective diagram of a periphery of an in-machine robot.

When it is desired that the end effector 46 accesses the target (for example, the workpiece 110) positioned near the rotary tool 100 from a positive side in the Z-axis direction, as shown in FIG. 2, the connecting mechanism 40 is rotated so that the second arm 42b is positioned at a more positive side in the Z-axis direction than the spindle head 36. On the other hand, when it is desired that the end effector 46 accesses the target positioned near the rotary tool 100 from the positive side in the Y-axis direction, as shown in FIG. 3, the connecting mechanism is rotated so that the second arm 42*b* is positioned at a more positive side in the Y-axis direction than the spindle head 36. Further, when the end effector 46 is not to be used, as shown in FIGS. 4 and 5, the first through third joints 44*a*-44*c* are driven to move the end effector 46 to a position where the end effector 46 does not interfere with the workpiece 110 and the tools 100 and 102.

The in-machine robot 20 may be used for various purposes. For example, the in-machine robot 20 may support the machining during the machining of the workpiece 110. Specifically, for example, the in-machine robot 20 supports at least one of the workpiece 110 and the tools 100 and 102 during the machining. With such a configuration, vibration or the like of the workpiece 110 or the tools 100 and 102 having a low rigidity can be suppressed. In addition, as an alternative configuration, the in-machine robot 20 may hold the workpiece 110 in place of the workpiece spindle device 14 during the machining. With such a configuration, the orientation of the workpiece 110 can be freely changed during the machining, and machining of a complex shape can be enabled. Further, as an alternative configuration, the in-machine robot 20 may apply vibration to the workpiece 110 and the tools 100 and 102 during the machining. With such a configuration, a special machining process can be enabled in which the workpiece is cut while vibration is applied. As a further alternative configuration, the in-machine robot 20 may discharge cooling fluid (cutting oil, cutting water) or air for removing swarf during the machining. By discharging the cooling fluid or the air by the in-machine robot 20 whose position and orientation can be freely changed, it becomes possible to more freely control the cutting characteristic and the temperature of the workpiece 110 and the tools 100 and 102.

Alternatively, the in-machine robot 20 may execute various sensing processes, for example, during the machining of the workpiece 110, or before or after the machining. Specifically, for example, the in-machine robot 20 may monitor a cutting state (precision of machined surface and state of swarf). As an alternative configuration, the in-machine robot 20 may sense the states of the workpiece 110 and the tools 100 and 102, for example, the temperature, the vibration, the distortion, or the like during the machining, and output to the sensed result to the control device 34. In this case, the control device 34 desirably changes various machining conditions (feed rate, rotational rate, or the like) as necessary, based on the information detected by the in-machine robot 20. Alternatively, the in-machine robot 20 may have a structure in which the shape of the workpiece 110 is measured before start of the machining or after completion of the machining. By measuring the shape of the workpiece before the start of the machining, it is possible to reliably prevent error in the attachment of the workpiece 110. By measuring the shape of the workpiece 110 after the completion of the machining, it is possible to judge quality of the machining result. As an alternative configuration, for example, the in-machine robot 20 may measure the states of the tools 100 and 102 (amount of wear, amount of protrusion, or the like) before the start of the machining or after the completion of the machining.

Further, the in-machine robot 20 may execute a work not directly related to the machining. Specifically, the in-machine robot 20 may execute a cleaning work for collecting the swarf which is spread in the machining chamber during the machining or after the completion of the machining. As an alternative configuration, the in-machine robot 20 may inspect the tool (checking presence/absence of wear and an amount of protrusion) or inspect movable parts of the machine tool 10 during a period in which the machining is not executed.

Further, the in-machine robot 20 may execute the work which has been executed by an out-of-machine robot in the related art, during the machining or after the completion of the machining. For example, the in-machine robot 20 may execute additional machining (such as removal machining such as trimming and die polishing, surface reformation, adding machining, or the like) on the workpiece 110. In addition, the in-machine robot 20 may transport, exchange, or arrange the workpiece 110 and the tools 100 and 102. Further, the in-machine robot 20 may examine or assemble various components.

As described above, the in-machine robot 20 may be used for various purposes. The type of the end effector 46 provided on the in-machine robot 20 may be selected according to the purpose desired for the in-machine robot 20. When such an in-machine robot 20 is used, it is desired that the in-machine robot 20 can access at least the workpiece 110 and the rotary tool 100 used for the machining, and it is more desirable that the in-machine robot 20 can access a large portion in the machining chamber. Moreover, when the machine tool is a multi-tasking machine having the rotational cutting function and the lathe-turning function, it is desirable that the in-machine robot 20 can also access the lathe-turning tool 102. In order to widen the access range of the in-machine robot 20, if the movable range of the in-machine robot 20 itself (that is, the movable range of the end effector 46 with respect to the connecting mechanism 40) is to be widened, a moving mechanism of the in-machine robot 20 becomes large. As a result, the size of the in-machine robot 20 would be increased, possibly causing a problem such as interference with other members. In addition, with the increase in the size of the in-machine robot 20, a size of the actuator such as the motor for driving the in-machine robot 20 is also increased, resulting in a problem in which weight and cost of the in-machine robot 20 as a whole are also increased.

As described above, the in-machine robot 20 is attached to the tool spindle device 16. The tool spindle device 16 holds the rotary tool 100 for machining the workpiece 110. Normally, in order to realize the machining of the workpiece 110 by the rotary tool 100, the tool spindle device 16 can be moved relatively with respect to the workpiece spindle device 14, in order to allow the rotary tool 110 to suitably access the workpiece 110. Therefore, by attaching the in-machine robot 20 to the tool spindle device 16, it becomes possible to position the in-machine robot 20 near the rotary tool 100 and the workpiece 110 even if the movable range of the in-machine robot 20 itself is narrow. As a result, it becomes possible to enable even an in-machine robot 20 having a relatively small size and a small movable range to reliably access the rotary tool 100 and the workpiece 110 during machining. In addition, by attaching the in-machine robot 20 on the tool spindle device 16, even when the movable range of the in-machine robot 20 itself is narrow, the movable range of the in-machine robot 20 with respect to the workpiece 110 can be increased.

Moreover, the tool spindle device 16 can linearly move in the X-axis, Y-axis, and Z-axis directions, and can also swing around the axis in the Y-axis direction. By attaching the in-machine robot 20 on the tool spindle device 16 which can move in the machining chamber in this manner, it becomes possible to enable the in-machine robot 20 to access not only the workpiece 110 and the tools 100 and 102, but also a wide range within the machining chamber. As a result, it becomes possible to execute various works with the in-machine robot 20 such as cleaning of the machining chamber, transporting the workpiece 110 into and out of the machining chamber, or the like. Further, by providing the device for inspection and cleaning of the in-machine robot 20 at a position which does not block the machining such as at an end of the machining chamber, it becomes possible to move the tool spindle device 16 together with the in-machine robot 20 as necessary, to inspect and clean the in-machine robot 20.

Figure 8:
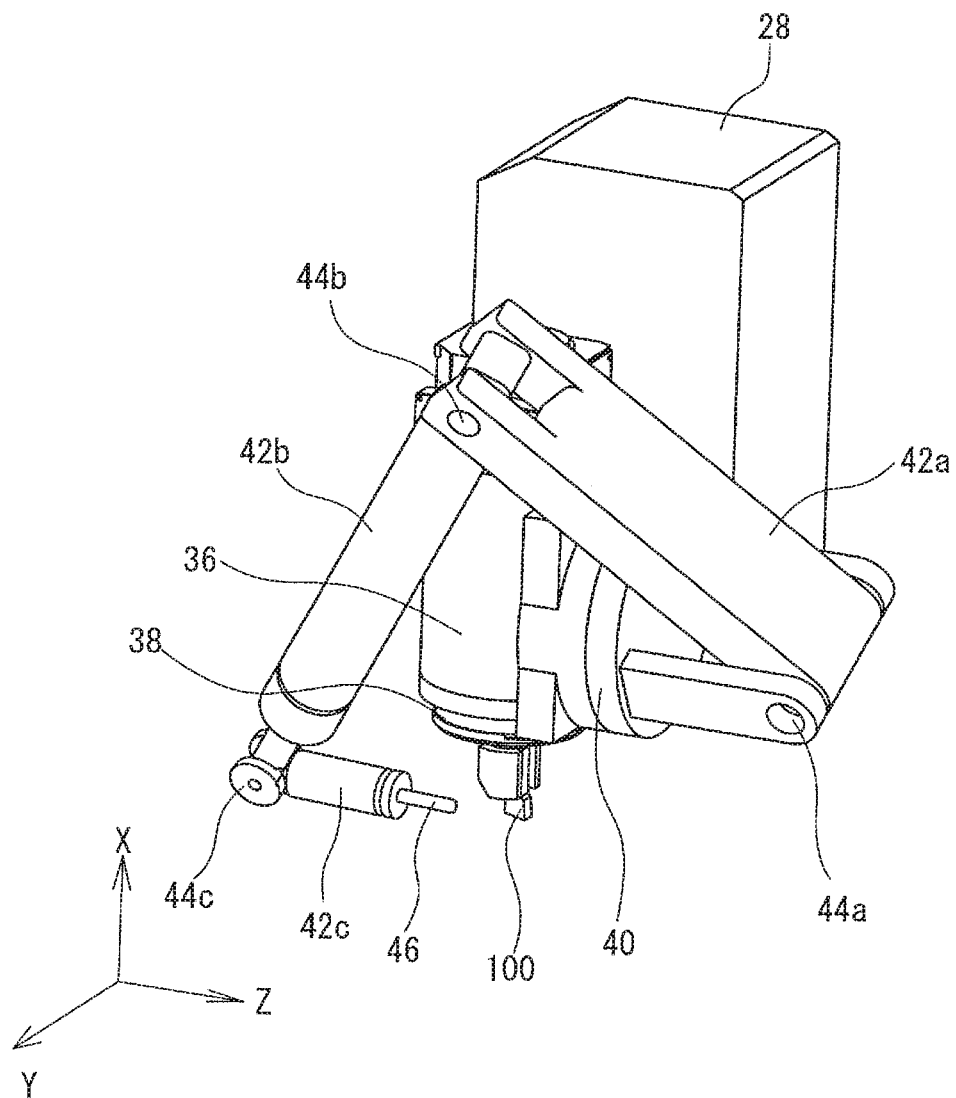
FIG. 8 is a diagram showing an in-machine robot fixed on a tool spindle device.
Figure 9:
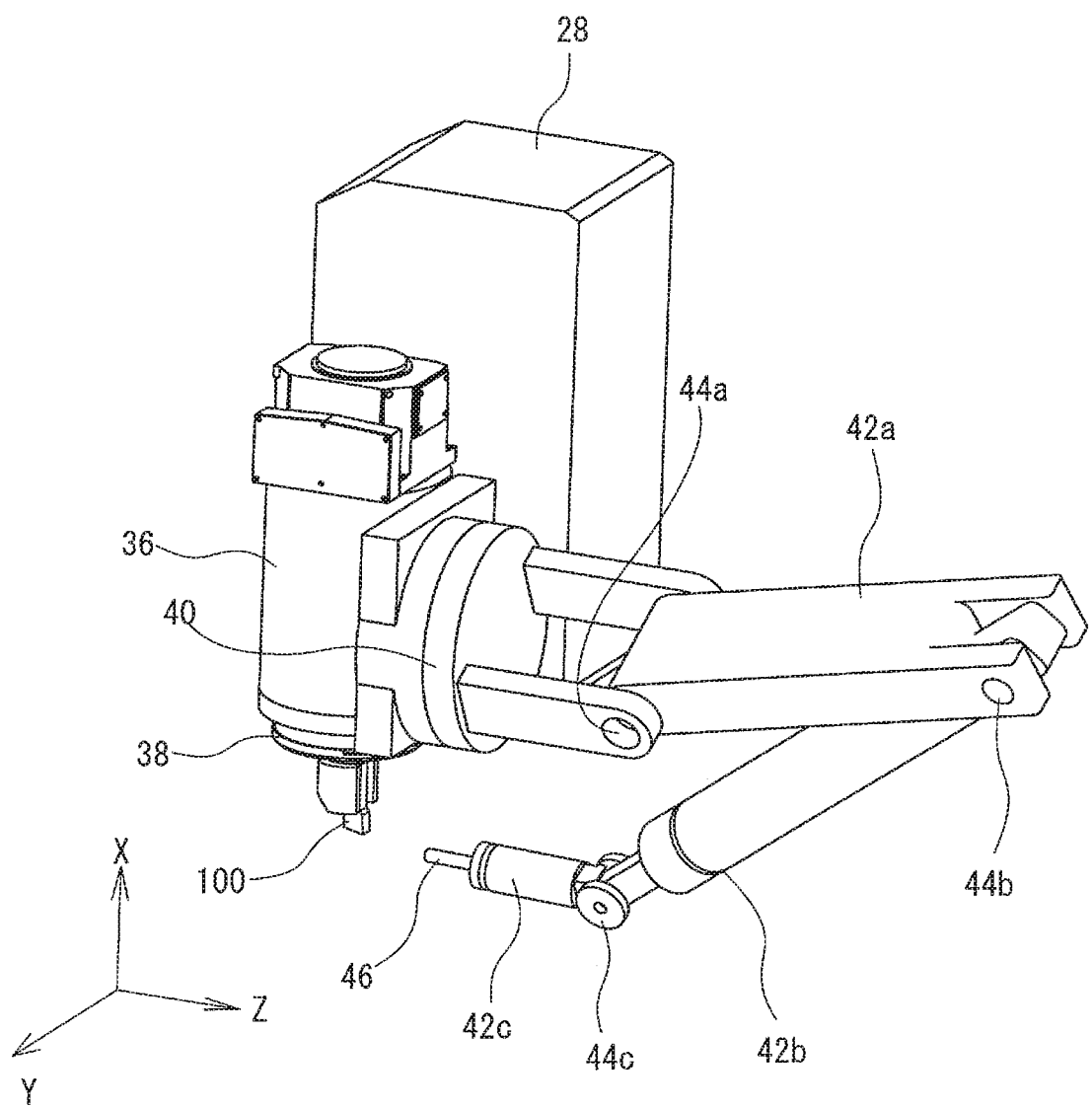
FIG. 9 is a diagram showing an in-machine robot fixed on a tool spindle device.

The in-machine robot 20 is attached to the spindle head 36 so that the in-machine robot 20 can move at the periphery of the spindle head 36 with the tool rotational axis Rt as a center. Because of this, even when the movable range of the in-machine robot 20 is small, the access direction and position of the in-machine robot 20 can be changed by a large amount. This characteristic will now be described with reference to FIGS. 8 and 9. FIGS. 8 and 9 are diagrams showing a case where the articulated in-machine robot 20 is fixed on a side surface of the spindle head 36 on the positive side in the Z-axis direction; that is, a case where the in-machine robot 20 cannot rotationally move around the tool rotational axis Rt. A case is considered in which the rotary tool 100 is to be accessed from the negative side in the Z-axis direction by the in-machine robot 20 fixed on the side surface of the spindle head 36 in the positive side in the Z-axis direction. In this case, as shown in FIG. 8, the in-machine robot 20 must extend across the front side of the spindle head 36 and to a position on a more negative side in the Z-axis direction than the spindle head 36. Because of this, in the in-machine robot 20, as compared to the in-machine robot 20 shown in FIGS. 1-7, the lengths of the arms 42 are significantly larger, and consequently, the size of the in-machine robot 20 as a whole is significantly larger.

A case is considered in which the rotary tool 100 is to be accessed from the positive side in the Z-axis direction with the in-machine robot 20. In this case, as shown in FIG. 9, the first and second arms 42a and 42b of the in-machine robot 20 must be folded, but the first and second arms 42a and 42b are relatively long. Because of this, even when the first and second arms 42a and 42b are folded, the amount of protrusion to the positive side in the Z-axis direction is still large. When the amount of protrusion of the in-machine robot 20 is large, the interference with the other members tends to occur more frequently. In addition, in order to avoid interference between the significantly protruding in-machine robot 20 and the other members, the movable range of the tool spindle device 16 must be significantly limited. Further, because the torque for driving the arm 42 having a large size and a heavy weight is increased, the size of the actuator such as the motor provided on each joint 44 must be increased.

On the other hand, as repeatedly described above, the in-machine robot 20 shown in FIGS. 1-7 can rotate around the tool rotational axis Rt. Because of this, as shown in FIGS. 2-5, even with the in-machine robot 20 of a relatively small size, the direction of access and the position of the end effector 46 can be freely changed, and the amount of protrusion of the in-machine robot 20 can be kept small. As a result, the interference between the in-machine robot 20 and the other members can be effectively prevented, and the movable range of the tool spindle device 16 can be widened. In addition, because the size of the arm 42 can be reduced, the torque for driving each arm 42 can be reduced, and the size of the actuator such as the motor provided on each joint 44 can be reduced.

The structure of the in-machine robot 20 described above is merely exemplary. No particular limitation is imposed on the structure of the in-machine robot 20, so long as the in-machine robot 20 is attached to the tool spindle device 16 in a state where the in-machine robot 20 can move around the tool spindle device 16 with the tool rotational axis Rt as a center. Therefore, the numbers, directions of swing, or the like of the joints 44 and the arms 42 of the in-machine robot 20 can be suitably changed.

Figure 6:
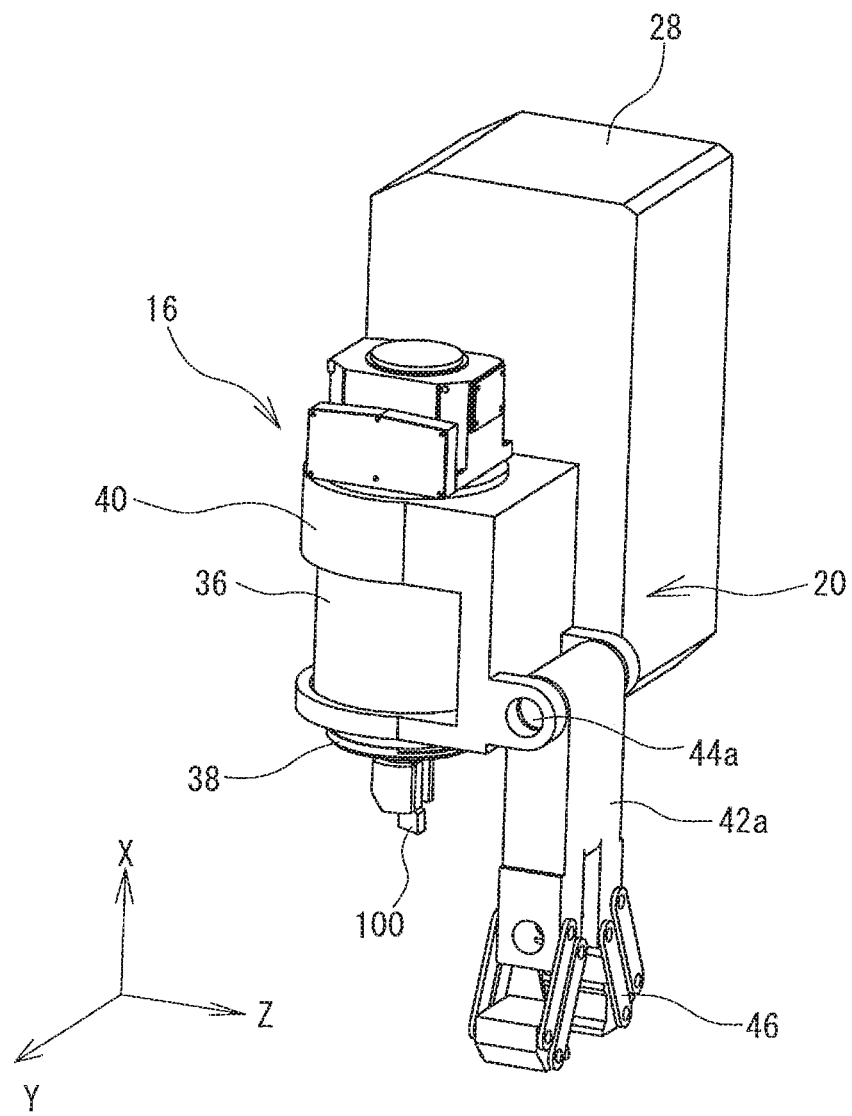
FIG. 6 is a perspective diagram showing another example of an in-machine robot.
Figure 7:
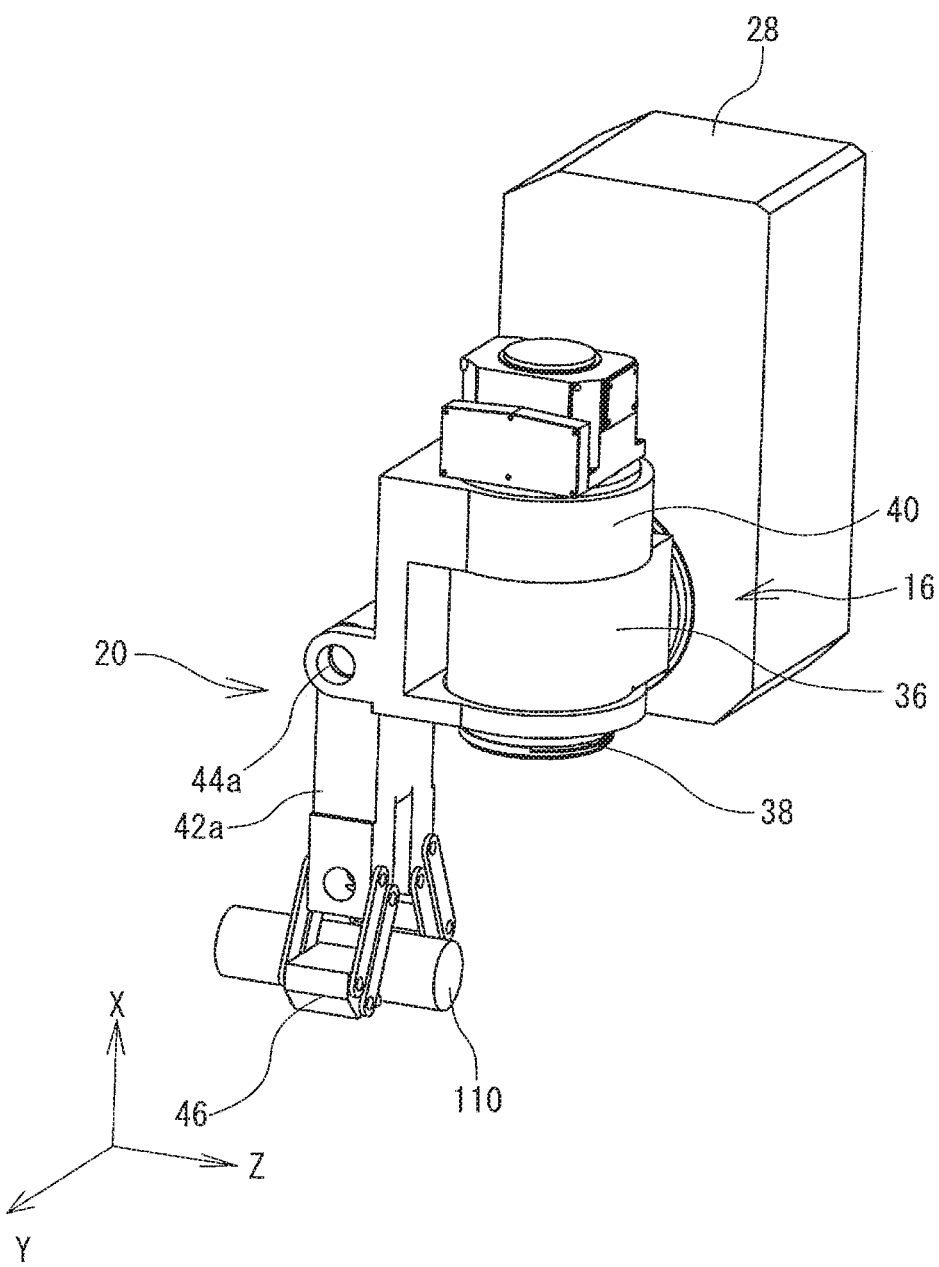
FIG. 7 is a perspective diagram showing another example of an in-machine robot.

For example, when the workpiece 110 is to be transported by the in-machine robot 20, as shown in FIGS. 6 and 7, there may be employed a structure having the first arm 42a, a hand-type end effector 46, and a first joint 44a. When the workpiece 110 is to be transported, the in-machine robot 20 does not need to take various orientations with respect to the tool spindle 38 and the rotary tool 100, and thus, the number of joints 44 of the in-machine robot 20 can be reduced. In particular, when the spindle head 36 can swing, the degree of freedom of the spindle head 36 itself is high. Thus, it becomes possible to increase the degree of freedom of the end effector 46 even when the number of joints 44 of the in-machine robot 20 is small. In addition, in lathe-turning, there are many cases where it is desired to revert the workpiece 110 during machining. In the multi-tasking machine having the lathe-turning function, if the in-machine robot 20 having the hand-type end effector 46 is provided, it becomes possible to easily revert the workpiece 110 using a revolution movement of the in-machine robot 20.

Desirably, the in-machine robot 20 is an arm-type robot having one or more arms and one or more joints, but alternatively, the in-machine robot 20 may be of another type. Therefore, the in-machine robot 20 may be, for example, an orthogonal robot formed by two or three orthogonal slide axes, a parallel-link robot which uses a parallel mechanism, or the like. Further, a center axis of the movement (revolution) of the in-machine robot 20 does not need to strictly coincide with the tool rotational axis Rt, and there may be a slight deviation. In addition, the connecting mechanism 40 may have other structures, so long as the connecting mechanism 40 attaches the in-machine robot 20 to the tool spindle device 16 so that the in-machine robot 20 moves at the periphery of the tool spindle device 16 with the tool rotational axis Rt as a center. For example, the connecting mechanism may have a structure with an approximate ring-shaped or approximate rectangular rail placed around the spindle head 36, in place of the bearing. In this case, the in-machine robot 20 is formed to be movable along the rail. The connecting mechanism 40 may be a separate member from the in-machine robot 20 or may be integrated with the in-machine robot 20. It is sufficient that the structure allows the primary portions of the in-machine robot 20 to move at the periphery of the tool spindle device 16 with the tool rotational axis Rt as a center.

In the above description, a multi-tasking machine having the tool spindle device 16 which holds the rotary tool 100 is exemplified. Alternatively, the present technique may be applied to other machine tools. The in-machine robot described herein may be equipped on a machining center or a milling machine which does not have the tool post or the workpiece spindle device. As an alternative configuration, the in-machine robot described herein may be provided on a machine tool which radiates energy or a material in a predefined irradiation axis direction, to form a workpiece. As the machine tool which radiates energy, for example, a waterjet machine, a laser machine, a electric discharge machine, or the like may be exemplified. As the machine tool which radiates a material, a layer former such as a 3D printer may be exemplified. In these machine tools, an irradiation head which radiates the energy or the material to the predefined irradiation axis direction is provided. In this case, the connecting mechanism attaches the in-machine robot on the irradiation head so that the in-machine robot can move at the periphery of the irradiation head, with the irradiation axis as a center. In addition, the number of in-machine robots attached to the tool spindle device and the irradiation head is not limited to one, and may be a plurality.

The invention claimed is:

1. A machine tool that cuts a workpiece by a tool, the machine tool comprising:
   a tool spindle device comprising:
     a tool spindle;
     a spindle head including the tool spindle;
     a drive motor operably connected to the tool spindle and structured to rotate the tool spindle around a predefined tool rotational axis;
     wherein the tool spindle is structured to hold the tool in a detachable manner;
   one or more robots;
   wherein the one or more robots are attached to the spindle head via a connecting mechanism so that the one or more robots move independently from the tool and revolve circularly about the same predefined tool rotational axis;
   the predefined tool rotational axis is at a center of the circular revolution; and
   the tool spindle device can swing with an axis orthogonal to the tool spindle axis as a center.

2. The machine tool according to claim 1, wherein the robot can access at least one of the tool and the workpiece during execution of machining of the workpiece by the tool.

3. The machine tool according to claim 2, wherein the robot executes at least one of a support of machining of the workpiece by the tool, sensing related to the tool or the workpiece during the machining, and additional machining.

4. The machine tool according to claim 1, wherein the robot executes at least one of a support of machining of the workpiece by the tool, sensing related to the tool or the workpiece during the machining, and additional machining.

5. The machine tool according to claim 1, wherein the robot is an arm-type robot comprising:
   one or more end effectors that act on a target;
   one or more arms that support the one or more end effectors; and
   one or more joints provided at ends of the one or more arms.

6. The machine tool according to claim 1, wherein the robot comprises a grip unit structured to grip the tool or the workpiece.

7. The machine tool according to claim 1, wherein the machine tool is a multi-tasking machine having a lathe function to lathe-turn the workpiece, and comprises:
   a workpiece spindle device that holds the workpiece in a manner to allow self-rotation; and
   a tool post that holds a lathe-turning tool which lathe-turns the self-rotating workpiece.

8. The machine tool according to claim 7, wherein the robot can access at least one of the workpiece and the lathe-turning tool during lathe-turning machining by the lathe-turning tool.

* * * * *